United States Patent Office 2,876,613
Patented Mar. 10, 1959

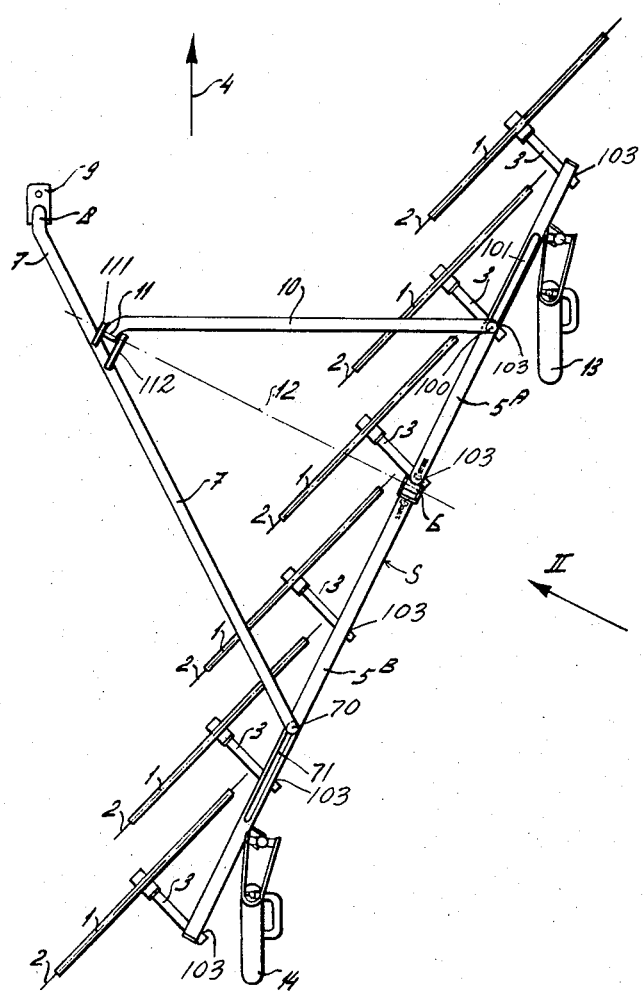
FIG:1

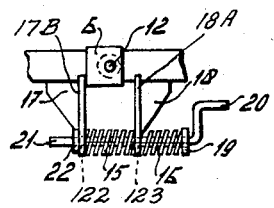
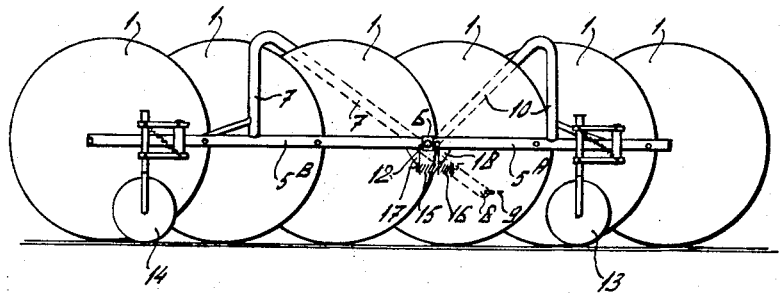
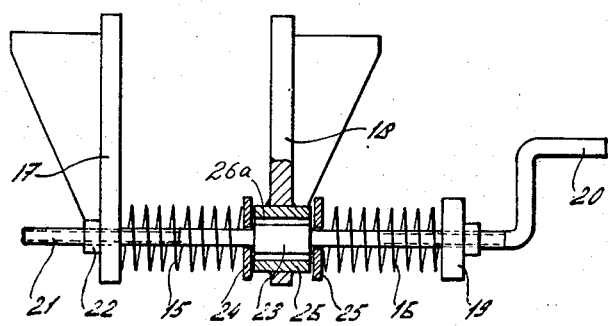

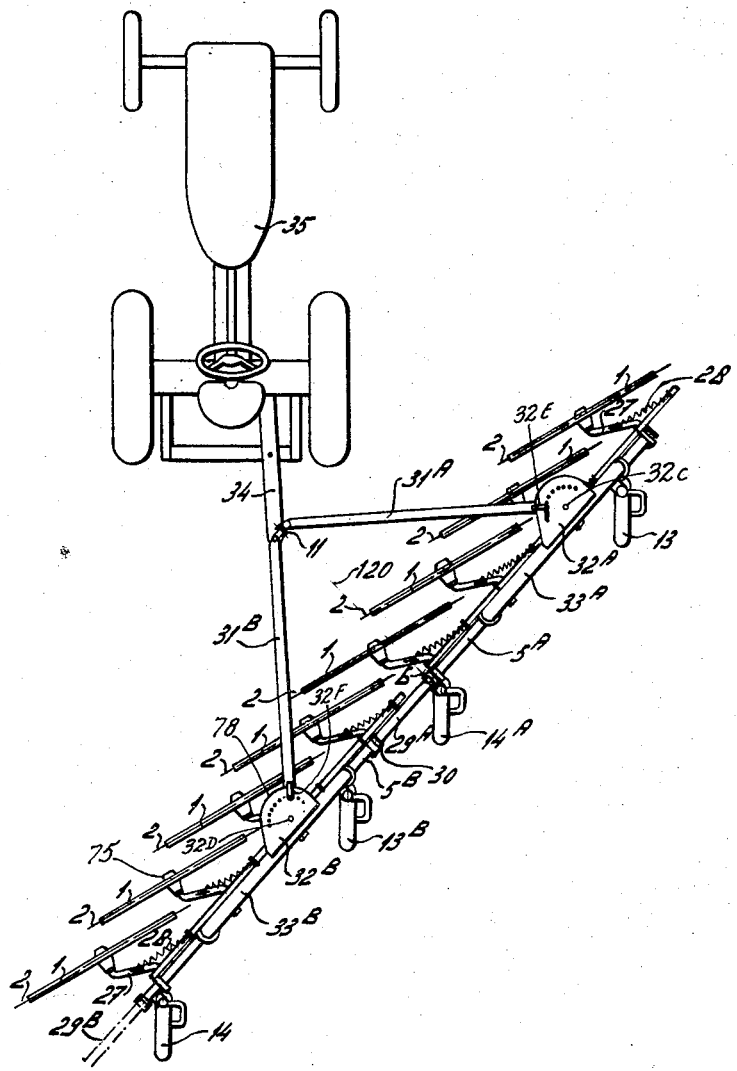

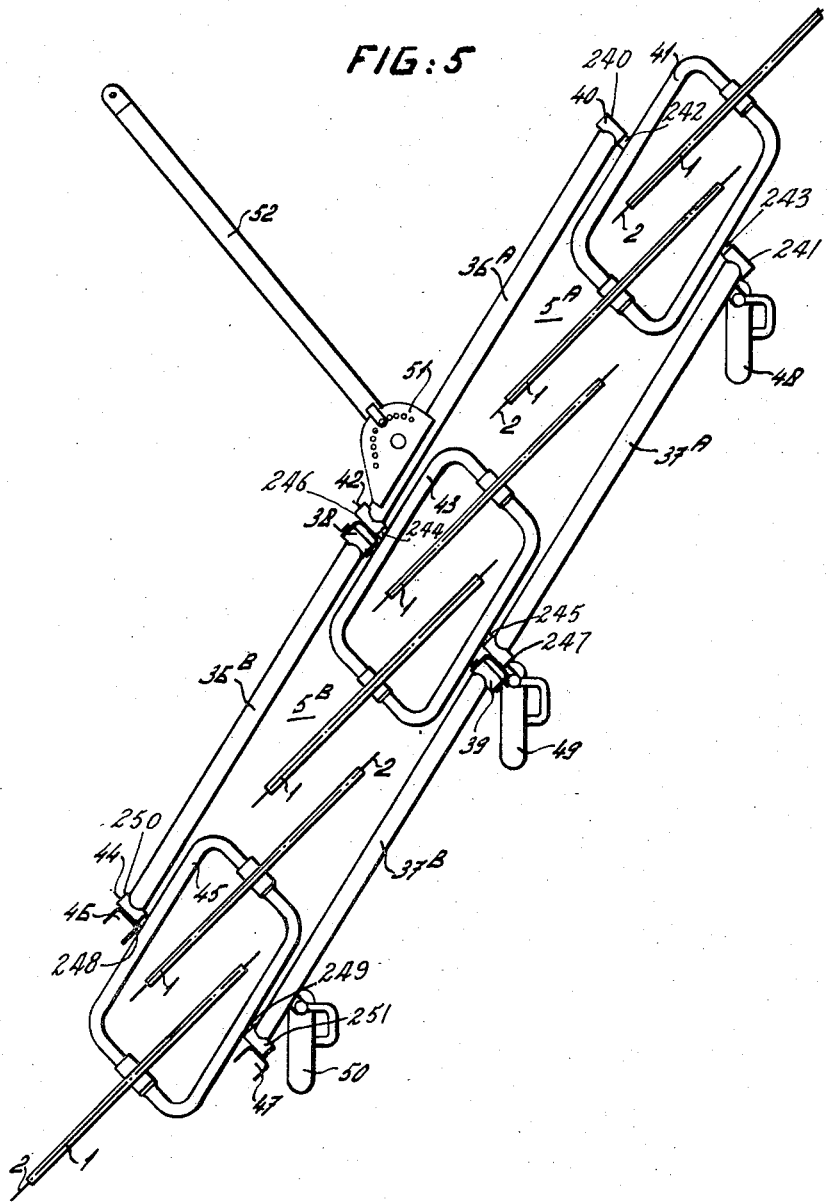

2,876,613

SIDE DELIVERY RAKE WITH SECTIONAL SUPPORT FOR THE RAKING MEMBERS

Cornelis van der Lely and Ary van der Lely, Maasland, Netherlands, assignors to C. van der Lely N. V., Maasland, Netherlands, a Dutch limited company of the Netherlands Application December 30, 1953, Serial No. 401,267

Claims priority, application Netherlands January 2, 1953

9 Claims. (Cl. 56—377)

This invention relates to devices for laterally displacing grass, hay or other rakable substance lying on the ground, and more particularly to devices of the type comprising a mobile frame including a support obliquely arranged with regard to the direction of travel of said frame, said support carrying a number of raking members provided with teeth or like catching means.

In known devices of the above mentioned kind, the support for the raking members is generally formed by an undivided girder or beam, or by a number of beams which are rigidly connected together. Especially when the number of rake wheels or raking members is great and consequently the support has a considerable length, this presents the drawback that the device can hardly adapt itself to uneven terrain, so that one or more rake wheels may become located at an excessive elevation above the ground and are, therefore, insufficiently in contact with the crop lying on the ground. Further, some of the rake wheels may be too strongly in contact with the ground. Thus, a regular raking action will not be assured, and in some instances the rake wheels might be strained too heavily.

It is an object of the present invention to obviate these drawbacks and to provide a device permitting a better adaptation of the raking members to very uneven terrain. According to the invention, the support for the raking members is divided into individual sections, said sections having a freedom of movement with regard to each other in a substantially vertical plane. Preferably, the sections of the support are hingedly connected to each other.

A further object of the invention is to enable a number of units which are each fit for use as an individual raking device to be joined together by their supports in such a manner that the support of one raking device is movably or hingedly connected to that of another raking device.

Further objects, features, details and advantages of the present invention will appear from the following description with reference to the accompanying drawings in which various embodiments of the invention have been illustrated by way of example and in which:

Fig. 1 is a plan view of a first embodiment;

Fig. 2 shows this embodiment in side elevation, seen in the direction of the arrow II in Fig. 1;

Fig. 2A shows a detail of the hinge and the spring mechanism between the sections of the support shown in Fig. 2 on a larger scale;

Fig. 3 shows another embodiment of the detail shown in Fig. 2A;

Fig. 4 is a plan view of a second embodiment of the device; and

Fig. 5 is a plan view of a third embodiment.

In Figs. 1 and 2, the device comprises a number of (e. g. six) rake wheels 1 which are provided with circumferential teeth 2 or similar catching members, said rake wheels being mounted on the ends of parallel arms 3 secured at 103 to longitudinal supports extending in oblique direction with regard to the direction of travel 4 of the raking device. Said longitudinal support is composed of two sections 5A and 5B which are substantially in alignment, the section 5A carrying the foremost three arms 3 and, therefore, also three rake wheels 1 and the section 5B carrying the remaining three arms 3 and rake wheels 1. The adjoining ends of the support sections 5A and 5B are connected together by a hinge 6 see Fig. 2A).

An arm 7 is connected to the support section 5B and braced by a bracing bar 71, said arm running from its point of connection 70 first upwards in substantially a vertical direction, then passing over two rake wheels 1 and extending obliquely in forward and downward direction, as clearly shown in Fig. 2. The free extremity 8 of said arm 7 is located below the level of the supports 5A, 5B and carries a connecting member 9 for a draw hook or other coupling device. To the support 5A is connected an arm 10 braced by a bracing bar 101 and running from its connecting point 100 first upwards in substantially a vertical direction and then passing over one or more rake wheels 1 in downward direction to the fore end of the arm 7, where said arms 7 and 10 are connected together by a hinge 11 supported on brackets 111 and 112. The hinges 6 and 11 are arranged in such a manner that they have a common hinge axis 120 which is substantially perpendicular to a vertical plane passing through the support sections 5A and 5B.

The support section 5A is supported at its fore end by a running wheel 13, while the support section 5B is supported at its rear end by a running wheel 14. The running wheels 13 and 14 are resiliently suspended in any conventional manner from the frame of the device.

Near the hinge 6, a spring mechanism is provided comprising two compression springs 15 and 16 (see also Fig. 2A). The spring 15 is located between the flange 17B of a stay 17 connected to the support section 5B and the flange 18A of a stay 18 secured to the support section 5A, whereas the spring 16 is mounted between the flange 18A of the stay 18 and a collar 19 connected to a shaft 21 passing through oblong apertures 122 and 123 of the flanges 17B and 18A and being threaded at one end and provided with a crank 20 at the other end. The threaded end of the shaft 21 engages a nut 22 which is rigidly connected to the flange 17B. Said spring mechanism tends to keep the support sections in a predetermined (stretched) position. When the hinge 6 collapses downwardly, the spring 16 is compressed; however, upon collapsing of the hinge in upward direction the spring 15 will be compressed. The pre-load of the spring 16 is adjustable by means of the crank 20.

Upon movement in the direction of the arrow 4, the described device acts as a side delivery rake, the overlapping rake wheels 1 being put into rotation by the contact of their teeth 2 with the ground and/or the crop lying thereon and said rake wheels delivering said crop in lateral direction.

Due to the spring mounted running wheels 13 and 14 and the resilient connection between the support sections 5A and 5B, the rake wheels or raking members 1 may be mounted upon rigid arms 3.

The spring mechanism near the hinge 6 shown in Fig. 1 still presents the drawback that when the spring 15 is put under tension, the spring 16 will be released, and conversely, so that upon collapsing of the hinge 6 there will be initially a smaller spring power opposing the collapsing movement. This drawback is obviated by the spring mechanism according to Fig. 3. In this mechanism, the shaft 21 is provided in its middle with a cylindrical bead 23, upon one end of which the spring 15 acts by means of a washer 24 which is movable along the shaft 21, whereas a corresponding washer 25 for the spring 16 rests against the other end of said bead. The cylindrical bead 23 is surrounded by a bushing 26 of about the same length, said bushing being fixed in a bore 26a of the flange 18a. This bushing 26 provides for the compression of spring 15 or spring 16 by means of the washer 24 or 25, respectively, whereby the spring 16 or 15 which is not compressed cannot be released since the washer 25 or 24 abuts against the bead 23 of the shaft 21.

In the embodiment shown in Fig. 4, the principle of the sectional support and the hingedly connected support sections has been applied for combining two devices which are individually fit for use as a side delivery rake into a single side delivery rake with a number of rake wheels that is equal to the total number of rake wheels of the individual side delivery rakes. The supports or support sections designated by 5A and 5B again carry a number of (e. g. four) overlapping rake wheels 1 which are provided with circumferential teeth 2. In this embodiment, said rake wheels are rotatably mounted on the pins 75 of cranks 27, the crank shafts of which are rotatably mounted in the support section 5A or 5B, respectively. Said cranks 27 are affected by springs 28 tending to reduce the pressure with which the rake wheels 1 rest upon the ground.

The hinge 6 does not connect the support sections 5A and 5B directly, but through the intermediary of a coupling member 29A which is in alignment with the support section 5A and of which the free extremity may be connected at 30 to the fore end of the support section 5B. The rear end of the support section 5B may be provided is a similar manner with a coupling member 29B hingedly connected thereto.

The joint support sections 5A and 5B are supported, besides by the two running wheels 13 and 14, by two other running wheels 14A and 13B, the running wheel 14A being located near the hinge 6. Each of the support sections is provided with an arm 31A and 31B, respectively, which are each pivotally connected to pins 32C and 32D adjustably connected to a segment shaped fastening member 32A and 32B and locked in position by pins 32E and 32F. The adjustable arms 31A and 31B, which are generally of the same length, are joined together by a hinge 11 of which the hinge axis 120 coincides with that of the hinge 6. Finally the hingedly connected arms 31A and 31B are connected to a tractor 35 by means of a fastening member 34.

It will be understood that upon disengaging the connections 30 and 11 two individual implements are formed which are each supported by the running wheels 13, 14A and 13B, 14, respectively, and are each provided with a draw arm 31A and 31B, respectively, so that each of said implements may be used as an individual side delivery rake. If desired, the coupling members 29A and 29B may respectively form part of the individual side delivery rake, or may be disconnected therefrom.

In the embodiment according to Fig. 5, the longitudinal support for the rake wheels is constituted by two substantially parallel beams composed of beam sections which are hingedly connected together, the rake wheels being mounted between said parallel beams. The whole longitudinal support thus comprises two support sections 5A and 5B, the support section 5A being composed of two beam sections 36A and 37A and the support section 5B comprising two beam sections 36B and 37B. The beam sections 36A and 36B are joined together by a hinge 38 and the beam sections 37A and 37B by a hinge 39. The beam sections 36A and 37A carry at the free extremity a closed bow 41 rotatably mounted between said beam sections on an axis 40 by means of shafts 242 and 243 accommodated in bushings 240 and 241 respectively fixed to the beams 36A and 37A, two rake wheels 1 being rotatably mounted on said bow 41. Near the hinges 38 and 39, the beam sections 36A and 37A carry a second bow 43 which is rotatable on an axis 42 by means of shafts 244 and 245 accommodated in bushings 246 and 247 respectively fixed to the beams 36A and 37A and upon said bow 43 the next two rake wheels are mounted. Finally a third pair of rake wheels is provided on a closed bow 45 which is rotatably mounted between the beam sections 36B and 37B on an axis 44 by means of shafts 248 and 249 in bushings 250 and 251 respectively fixed to the beams 36B and 37B. If desired, the beam sections 36B and 37B may be provided beyond the axis 44 with hingedly mounted couplings 46 and 47 for connection to a following support section. The support section 5A is equipped with two running wheels 48 and 49; the support section 5B has only one running wheel 50 and this is the case in all following support sections.

The beam section 36A carries a segment shaped fastening member 51 to which a draw arm 52 is adjustably connected and may be locked in position, in the same manner as has been described with reference to the draw arm 31A shown in Fig. 4.

What we claim is:

1. A device for laterally displacing rakable substance lying on the ground comprising a mobile frame, a support included in said mobile frame and obliquely arranged with regard to the direction of travel of said mobile frame, said support carrying a number of raking members provided with means for engaging the substance to be raked, said support being provided in sections arranged in alignment and connected together by a first hinge having a hinge axis extending transversely to said aligned sections of said support, each of said support sections carrying between said hinge and the extremity opposite thereto an arm, and the arms of the support sections being connected together by a second hinge having a hinge axis substantially coinciding with the hinge axis of said first hinge.

2. A device as defined in claim 1, further comprising a spring mechanism disposed adjacent said first hinge and yieldably urging said support sections to a predetermined position with regard to each other.

3. A device as defined in claim 2, wherein said spring mechanism includes oppositely acting springs causing any deviation of the support sections from the predetermined position to be opposed from the beginning by an appreciable spring force.

4. A device as defined in claim 1, wherein at least one of the support sections is supported by at least two running wheels, whereby said section is detachable to form a unit for individual use as a device for laterally displacing rakable substance lying on the ground.

5. A device as defined in claim 4, wherein said first hinge is separable with the support section forming said individual unit, from the other section, and further comprising a coupling member connected to said first hinge and adapted for removable, rigid attachment to another support section.

6. A device for laterally displacing material lying on the ground and provided with a number of rake wheels mounted on a mobile support, said rake wheels being put into rotation by their contact with the ground and/or with material lying thereon, the said support comprising a section which is rotatably connected about a horizontal axis with respect to the remaining part of the support, at least two of the said rake wheels being rotatably mounted on said support section with their axes of rotation immovably interconnected thereby.

7. A device as defined in claim 6, wherein the said support section is resiliently connected to said remaining part of the support, a draft member being directly connected to said remaining part of the support.

8. A device for laterally displacing rakable substance lying on the ground comprising a mobile frame, a support included in said mobile frame and obliquely arranged with regard to the direction of travel of said mobile frame, said support carrying a number of raking members provided with means for engaging the substance to be raked, said support being provided in sections arranged in alignment, a first hinge connecting together said support sections and having a hinge axis extending transversely to said aligned sections of the support, a draw coupling, elongated members connecting said support sections to said draw coupling, a second hinge connecting together said elongated members and having a hinge axis substantially coinciding with the hinge axis of said first hinge.

9. A device as in claim 8, wherein said elongated members converge forwardly from said support sections to said second hinge.

References Cited in the file of this patent

UNITED STATES PATENTS

| | | |
|---|---|---|
| 2,602,280 | Crowe et al. | July 8, 1952 |
| 2,672,721 | Adams | Apr. 23, 1954 |
| 2,680,343 | Enos | June 8, 1954 |
| 2,683,345 | Meyer | July 13, 1954 |

FOREIGN PATENTS

| | | |
|---|---|---|
| 1,163 | Great Britain | of 1907 |
| 680,537 | Great Britain | Oct. 8, 1952 |